(12) United States Patent
Hwang et al.

(10) Patent No.: US 8,477,799 B2
(45) Date of Patent: Jul. 2, 2013

(54) METHOD FOR USING FLEXIBLE BANDWIDTH IN OFDMA-BASED COGNITIVE RADIO SYSTEM, BASE STATION AND SUBSCRIBER STATION USING THE SAME

(75) Inventors: Sung Hyun Hwang, Daejeon (KR); Myung Sun Song, Daejeon (KR); Yun Hee Kim, Yongin (KR); Chang Joo Kim, Daejeon (KR); Gwangzeen Ko, Seoul (KR); Jung Sun Um, Suwon (KR)

(73) Assignees: Electronics and Telecommunications Research Institute, Daejeon (KR); Industry Academic Cooperation Foundation of Kyunghee University, Gyeonggi-do (KR)

( * ) Notice: Subject to any disclaimer, the term of this patent is extended or adjusted under 35 U.S.C. 154(b) by 110 days.

(21) Appl. No.: 12/092,722
(22) PCT Filed: Nov. 7, 2006
(86) PCT No.: PCT/KR2006/004651
§ 371 (c)(1),
(2), (4) Date: Aug. 22, 2008
(87) PCT Pub. No.: WO2007/052995
PCT Pub. Date: May 10, 2007

(65) Prior Publication Data
US 2009/0135713 A1 May 28, 2009

Related U.S. Application Data
(60) Provisional application No. 60/734,146, filed on Nov. 7, 2005, provisional application No. 60/737,289, filed on Nov. 16, 2005, provisional application No. 60/777,051, filed on Feb. 27, 2006.

(30) Foreign Application Priority Data
Nov. 7, 2006 (KR) .................. 10-2006-0109433

(51) Int. Cl.
*H04J 3/16* (2006.01)
*H04J 9/00* (2006.01)
*H04W 4/00* (2009.01)
*H04W 72/00* (2009.01)

(52) U.S. Cl.
USPC ......... 370/437; 370/329; 370/208; 455/452.2
(58) Field of Classification Search
USPC .............. 370/351, 389, 395.1, 395.4, 395.41, 370/464, 465, 468, 203, 208, 329, 343, 431, 370/437; 455/450–454
See application file for complete search history.

(56) References Cited

U.S. PATENT DOCUMENTS
2002/0063622 A1 5/2002 Armstrong et al.
2002/0168022 A1 11/2002 Kim
(Continued)

FOREIGN PATENT DOCUMENTS
KR 1020010043962 5/2001
KR 1020040056484 7/2004
(Continued)

OTHER PUBLICATIONS
International Search Report mailed Feb. 13, 2007; PCT/KR2006/004651.
(Continued)

*Primary Examiner* — Paul H Masur
(74) *Attorney, Agent, or Firm* — Ladas & Parry LLP

(57) ABSTRACT

Provided are a method for using a flexible bandwidth in an orthogonal frequency division multiple access (OFDMA)-based cognitive radio system, and a base station (BS) and a subscriber station using the method. The method includes: allocating a channel band from among unused channel bands having a bandwidth that is a natural number times a bandwidth resolution to customer premises equipment (CPE), wherein the bandwidth resolution is a predetermined bandwidth smaller than a bandwidth of a broadcast channel band, and transmitting an OFDMA-based signal comprising band allocation information indicating information regarding the allocated channel band.

39 Claims, 12 Drawing Sheets

U.S. PATENT DOCUMENTS

| | | | |
|---|---|---|---|
| 2003/0059050 | A1 | 3/2003 | Hohberger et al. |
| 2004/0181681 | A1 | 9/2004 | Salisbury |
| 2004/0233040 | A1 | 11/2004 | Lane et al. |
| 2006/0171354 | A1* | 8/2006 | Tee et al. .................. 370/329 |
| 2006/0270416 | A1* | 11/2006 | Perets et al. ............ 455/452.2 |
| 2008/0056333 | A1* | 3/2008 | Lakkis ...................... 375/130 |
| 2009/0060076 | A1* | 3/2009 | Ma et al. ................... 375/260 |
| 2010/0080167 | A1* | 4/2010 | Cordeiro et al. ........... 370/328 |

FOREIGN PATENT DOCUMENTS

| | | |
|---|---|---|
| KR | 1020050048861 | 5/2005 |
| WO | 2005/096538 | 10/2005 |

OTHER PUBLICATIONS

Prepared by the IEEE 802.22 Working Group of the LAN/MAN Standards Committee; "IEEE P802.22™/*WDv0.4.8* Draft Standard for Wireless Regional Area Networks Part 22: Cognitive Wireless RAN Medium Access Control (MAC) and Physical Layer (PHY) specifications: Policies and procedures for operation in the TV Bands", Copyright © 2006 by the Institute of Electrical and Electronics Engineers, Inc. Three Park Avenue New York, New York 10016-5997, USA, 367 pages.

Timo Weiss, et al; "Efficient Signaling of Spectral Resources in Spectrum Pooling Systems"SCVT2003; www.teco.edu/~krohn/efficient_signaling.pdf; 6 pages.

Timo A. Weiss, et al; "Spectrum Pooling: An Innovative Strategy for the Enhancement of Spectrum Efficiency", IEEE Radio Communications, Mar. 2004; 7 pages.

Stefan Mangold, et al; "Spectrum Agile Radio: A Society of Machines with Value-Orientation—Invited Paper_", Wireless Conference 2005—Next Generation Wireless and Mobile Communications and Services (European Wireless), 11th European, Apr. 10-13, 2005, pp. 1-8.

* cited by examiner

FIG. 2

| BASIC FFT SIZE \ NO. OF BONDED CHANNEL BAND | 1 | 2 | 3 | 4 |
|---|---|---|---|---|
| 1K | 1K | 2K | 4K | 4K |
| 2K | 2K | 4K | 8K | 8K |
| 4K | 4K | 8K | NA | NA |
| 8K | 8K | NA | NA | NA |

(NA: NOT AVAILABLE)

FIG. 3A

| Mode | 1K | 2K | 4K | 8K |
|---|---|---|---|---|
| FFT Size | 1024 | 2048 | 4096 | 8192 |
| Bandwidth (k = 1, 2, ..., 6) | k MHz | | | |
| Sampling Factor | 8/7 | | | |
| No. of Used Subcarriers (including pilot, but not DC) | 140 * k | 280 * k | 560 * k | 1120 * k |
| Sampling Frequency | 48/7 MHz | | | |
| Subcarrier Spacing | *6.696 kHz*[***] | *3.348 kHz* | *1.674 kHz* | *0.837 kHz* |
| Occupied Bandwidth | *6.696 kHz*140*k* | *3.348 kHz*280*k* | *1.674 kHz*560*k* | *0.837 kHz*1120*k* |
| Bandwidth Efficiency[*] | 93~94 % | | | |
| FFT Time | *149.33 us* | *298.66 us* | *597.33 us* | *1194.66 us* |
| Cyclic Prefix Time[**] | *37.33 us* | *74.66 us* | *149.33 us* | *298.66 us* |
| OFDMA Symbol Time | *186.66 us* | *373.33 us* | *746.66 us* | *1493.3 us* |

(*) Bandwidth Efficiency = Subcarrier Spacing * (Number of Used Subcarriers + 1)/BW
(**) It is assumed that cyclic prefix mode is 1/4.
(***) Italics indicate an approximated value.

FIG. 3B

| Mode | 1K | 2K | 4K | 8K |
|---|---|---|---|---|
| FFT Size | 1024 | 2048 | 4096 | 8192 |
| Bandwidth (k = 1, 2, ..., 7) | k MHz | | | |
| Sampling Factor | 8/7 | | | |
| No. of Used Subcarriers (including pilot, but not DC) | 120 * k | 240 * k | 480 * k | 960 * k |
| Sampling Frequency | 8 MHz | | | |
| Subcarrier Spacing | *7.812 kHz*[***] | *3.906 kHz* | *1.953 kHz* | *0.976 kHz* |
| Occupied Bandwidth | *7.812* kHz*120*k | *3.906* kHz*240*k | *1.953* kHz*480*k | *0.976* kHz*960*k |
| Bandwidth Efficiency[*] | *93~94 %* | | | |
| FFT Time | 128 us | 256 us | 512 us | 1024 us |
| Cyclic Prefix Time[**] | 32 us | 64 us | 128 us | 256 us |
| OFDMA Symbol Time | 160 us | 320 us | 640 us | 1280 us |

(*) Bandwidth Efficiency = Subcarrier Spacing * (Number of Used Subcarriers + 1)/BW
(**) It is assumed that cyclic prefix mode is 1/4.
(***) Italics indicate an approximated value.

FIG. 3C

| Mode | 1K | 2K | 4K | 8K |
|---|---|---|---|---|
| FFT Size | 1024 | 2048 | 4096 | 8192 |
| Bandwidth (k = 1, 2, ..., 8) | k MHz | | | |
| Sampling Factor | 8/7 | | | |
| No. of Used Subcarriers (including pilot, but not DC) | 105 * k | 210 * k | 420 * k | 840 * k |
| Sampling Frequency | 64/7 MHz | | | |
| Subcarrier Spacing | *8.928 kHz*[***] | *4.464 kHz* | *2.232 kHz* | *1.116 kHz* |
| Occupied Bandwidth | *8.928* kHz*105*k | *4.464* kHz*210*k | *2.232* kHz*420*k | *1.116* kHz*840*k |
| Bandwidth Efficiency[*] | *93~94 %* | | | |
| FFT Time | 112 us | 224 us | 448 us | 896 us |
| Cyclic Prefix Time[**] | 28 us | 56 us | 112 us | 224 us |
| OFDMA Symbol Time | 140 us | 280 us | 560 us | 1120 us |

(*) Bandwidth Efficiency = Subcarrier Spacing * (Number of Used Subcarriers + 1)/BW
(**) It is assumed that cyclic prefix mode is 1/4.
(***) Italics indicate an approximated value.

FIG. 4A

| Mode | 1K | 2K | 4K | 6K |
|---|---|---|---|---|
| FFT Size | 1024 | 2048 | 4096 | 6144 |
| Bandwidth (k = 1, 2, ..., 6) | k MHz | | | |
| Sampling Factor | 4/3 | | | |
| No. of Used Subcarriers (including pilot, but not DC) | 120 * k | 240 * k | 480 * k | 720 * k |
| Sampling Frequency | 8 MHz | | | |
| Subcarrier Spacing | *7.812 kHz*(***) | *3.906 kHz* | *1.953 kHz* | *1.302 kHz* |
| Occupied Bandwidth | *7.812* kHz*120*k | *3.906* kHz*240*k | *1.953* kHz*480*k | *1.302* kHz*720*k |
| Bandwidth Efficiency(*) | 93~94 % | | | |
| FFT Time | 128 us | 256 us | 512 us | 768 us |
| Cyclic Prefix Time(**) | 32 us | 64 us | 128 us | 192 us |
| OFDMA Symbol Time | 160 us | 320 us | 640 us | 960 us |

(*) Bandwidth Efficiency = Subcarrier Spacing * (Number of Used Subcarriers + 1)/BW
(**) It is assumed that cyclic prefix mode is 1/4.
(***) Italics indicate an approximated value.

FIG. 4B

| Mode | 1K | 2K | 4K | 6K |
|---|---|---|---|---|
| FFT Size | 1024 | 2048 | 4096 | 6144 |
| Bandwidth (k = 1, 2, ..., 7) | k MHz | | | |
| Sampling Factor | 8/7 | | | |
| No. of Used Subcarriers (including pilot, but not DC) | 120 * k | 240 * k | 480 * k | 720 * k |
| Sampling Frequency | 8 MHz | | | |
| Subcarrier Spacing | *7.812 kHz*(***) | *3.906 kHz* | *1.953 kHz* | *1.302 kHz* |
| Occupied Bandwidth | *7.812* kHz*120*k | *3.906* kHz*240*k | *1.953* kHz*480*k | *1.302* kHz*720*k |
| Bandwidth Efficiency(*) | 93~94 % | | | |
| FFT Time | 128 us | 256 us | 512 us | 768 us |
| Cyclic Prefix Time(**) | 32 us | 64 us | 128 us | 192 us |
| OFDMA Symbol Time | 160 us | 320 us | 640 us | 960 us |

(*) Bandwidth Efficiency = Subcarrier Spacing * (Number of Used Subcarriers + 1)/BW
(**) It is assumed that cyclic prefix mode is 1/4.
(***) Italics indicate an approximated value.

FIG. 4C

| Mode | 1K | 2K | 4K | 6K |
|---|---|---|---|---|
| FFT Size | 1024 | 2048 | 4096 | 6144 |
| Bandwidth (k = 1, 2, ..., 8) | k MHz | | | |
| Sampling Factor | 1 | | | |
| No. of Used Subcarriers (including pilot, but not DC) | 120 * k | 240 * k | 480 * k | 720 * k |
| Sampling Frequency | 8 MHz | | | |
| Subcarrier Spacing | *7.812 kHz*[***] | *3.906 kHz* | *1.953 kHz* | *1.302 kHz* |
| Occupied Bandwidth | *7.812 kHz*120*k* | *3.906 kHz*240*k* | *1.953 kHz*480*k* | *1.302 kHz*720*k* |
| Bandwidth Efficiency[*] | 93~94 % | | | |
| FFT Time | 112 us | 224 us | 448 us | 672 us |
| Cyclic Prefix Time[**] | 28 us | 56 us | 112 us | 168 us |
| OFDMA Symbol Time | 140 us | 280 us | 560 us | 840 us |

(*) Bandwidth Efficiency = Subcarrier Spacing * (Number of Used Subcarriers + 1)/BW
(**) It is assumed that cyclic prefix mode is 1/4.
(***) Italics indicate an approximated value.

FIG. 5

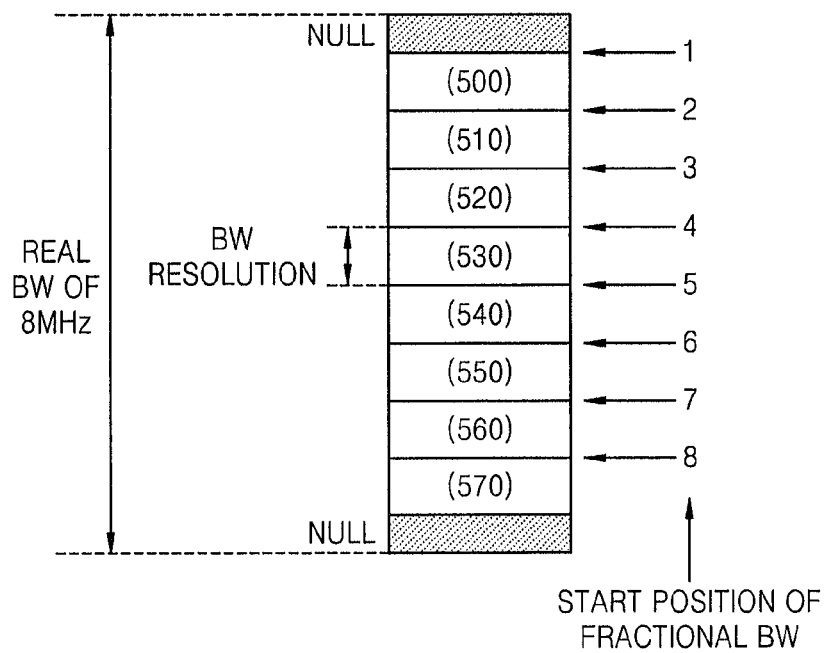

FIG. 8
| Index | Fractional BW | Start Position | PN Sequence (1680 bits) |
|---|---|---|---|
| 0 | 1 | 0 | 0x251D994101EDA04D8BD0B8EA6FA20AE590C2CC199AB083C6AE61F091F2DD41D989EC164B1481D611BE9CE A0094AFE9DB56A4763F55B26E54EAB73ACD7D4BBA64C1421BC3EB9D67113A5FB9C529AADC9CAB1FB882905 601778659CDB69AFCBADDF8B42314A7985B5F87C20692309D350454FF9326481683FADAE4711DD0CC5DACEDF 7CD5DF1177D60EBA4DBE657F19F08189EFC6B5DE6C2CFDCD13195DE077586B8EE01E00B6468B10A53FAAC1D D846E2A01681980D444B6AD0D34C34EC9CFD9341507878EC9FBAE498F5A20614BDF3E4B22D |
| 1 | 1 | 1 | |
| 2 | 1 | 2 | |
| 3 | 1 | 3 | |
| 4 | 1 | 4 | |
| 5 | 1 | 5 | |
| 6 | 1 | 6 | This sequence can be selected to minimize the PAPR |
| 7 | 1 | 7 | |
| 8 | 2 | 0 | |
| 9 | 2 | 1 | |
| 10 | 2 | 2 | |
| 11 | 2 | 3 | |
| 12 | 2 | 4 | |
| 13 | 2 | 5 | |
| 14 | 2 | 6 | |
| ... | ... | ... | ... |
| 33 | 7 | 1 | |
| 34 | 7 | 2 | |
| 35 | 8 | 1 | |
FIG. 9A
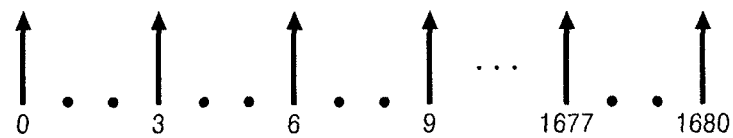
FIG. 9B
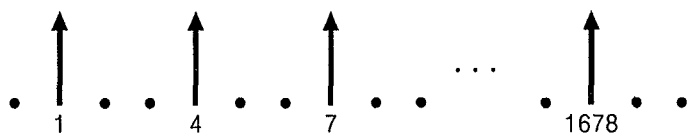

METHOD FOR USING FLEXIBLE BANDWIDTH IN OFDMA-BASED COGNITIVE RADIO SYSTEM, BASE STATION AND SUBSCRIBER STATION USING THE SAME

TECHNICAL FIELD

The present invention relates to an orthogonal frequency division multiple access (OFDMA)-based cognitive radio system and a method therefor, and more particularly, to an OFDMA-based cognitive radio system effectively using a fractional band or an empty band corresponding to a bundle of fractional bands and a method therefor.

BACKGROUND ART

Demands for services using radio communications have increased. However, frequency bands that are suitable in terms of transmission characteristics and development of devices have been occupied. Thus, secondary users desiring to provide new services use radio cognitive technology to detect unused frequency channels through temporal and/or specific inspections of frequency channels allowed to primary users so as to use the unused frequency channels. In this case, primary and secondary users refer to communication systems operated by different services or businesses. Primary users correspond to incumbent users (IUs), and secondary users correspond to users of cognitive radio systems.

The IEEE802.22 standard desires to provide data, voice (VoIP) and audio/video services in frequency bands used in televisions (TVs) (e.g., a band from 54 MHz to 698 MHz corresponding to U.S. TV channels 2 through 51 or an international band from 41 MHz to 910 MHz) using times and spaces, which are not used by primary users of televisions (TVs) or radio devices. In order to use an allocated TV frequency band in an IEEE802.22 system (a base station (BS), customer premises equipment (CPE), or a core network), a BS and CPE of a secondary user must know about the current state of a channel. For this purpose, the BS and CPE of the secondary user must scan a band from 41 MHz to 910 MHz in order to monitor the use state of the channel, wherein the band is a current TV channel. Thus, the channel can be changed to another channel when a primary user desires to use the channel while the secondary user is using the channel.

The IEEE802.22 system uses a plurality of broadcast channel bands each having a bandwidth of 6, 7, or 8 MHz within the band from 41 MHz to 910 MHz allocated to a TV broadcast. In detail, a BS and CPE of the IEEE802.22 system use a currently unused broadcast channel band of the plurality of broadcast channel bands. In other words, the IEEE802.22 system accesses each broadcast channel band.

In the present specification, a fraction of a broadcast channel band is referred to as a fractional band to describe a method and a system for using a flexible bandwidth in a cognitive radio system.

In an existing cognitive radio system, if a system of a primary user uses a fraction of a bandwidth of a broadcast channel a system of a secondary user may not use most of the broadcast channel band except for the fraction of the bandwidth. For example, if a 200 kHz narrowband radio device uses a broadcast channel band having a bandwidth of 6 MHz, systems of secondary users may not use a bandwidth of 5.8 MHz of the broadcast channel band. In this case, a band having bandwidths of 200 kHz and 5.8 MHz corresponds to the above-described fractional band.

The efficiency of a cognitive radio system depends on whether a currently unused channel is effectively detected so as to appropriately select a service suitable for the currently unused channel and provide the service to a secondary user. In other words, the efficiency of the cognitive radio system depends on how much a confined channel bandwidth is effectively used. Thus, according to existing cognitive radio systems, a bandwidth of 5.8 MHz corresponding to 96.6% of a broadcast channel bandwidth of 6 MHz is not used and is thus inefficient.

DETAILED DESCRIPTION OF THE INVENTION

Technical Problem

The present invention provides a method for effectively using a fractional band of a broadcast channel band in a flexible bandwidth orthogonal frequency division multiple access (OFDMA)-based cognitive radio system, and a base station (BS) and a subscriber station using the same.

The method includes a method of allocating a flexible bandwidth, a method of constituting OFDMA parameters, and a method of detecting the allocated flexible bandwidth.

Technical Solution

According to an aspect of the present invention, there is provided a base station (BS) of an orthogonal frequency division multiple access (OFDMA)-based cognitive radio system including: a band allocator allocating a channel band of unused channel bands having a bandwidth that is a natural number times a bandwidth resolution to CPE (customer premises equipment), wherein the bandwidth resolution is a predetermined bandwidth smaller than a bandwidth of a broadcast channel band; and a transmitter transmitting an OFDMA-based signal comprising band allocation information indicating information regarding the allocated channel band.

According to another aspect of the present invention, there is provided a CPE of an OFDMA-based cognitive radio system including: a receiver receiving an OFDMA-based signal comprising band allocation information indicating information regarding a channel band allocated from a BS; and a band allocation information detector detecting the band allocation information based on the received OFDMA-based signal, wherein the allocated channel band is a channel band of unused channel bands having a bandwidth that is a natural number times a bandwidth resolution, wherein the bandwidth resolution is a predetermined bandwidth smaller than a bandwidth of a broadcast channel band.

According to another aspect of the present invention, there is provided a method of using a flexible bandwidth through a BS in an OFDMA-based cognitive radio system, including: allocating a channel band of unused channel bands having a bandwidth that is a natural number times a bandwidth resolution to CPE, wherein the bandwidth resolution is a predetermined bandwidth smaller than a bandwidth of a broadcast channel band; and transmitting an OFDMA-based signal comprising band allocation information indicating information regarding the allocated channel band.

According to another aspect of the present invention, there is provided a method of using a flexible bandwidth through CPE in an OFDMA-based cognitive radio system, including: allocating a channel band of unused channel bands having a bandwidth that is a natural number times a bandwidth resolution to CPE, wherein the bandwidth resolution is a predetermined bandwidth smaller than a bandwidth of a broadcast channel band; and transmitting an OFDMA-based signal comprising band allocation information indicating information regarding the allocated channel band.

According to another aspect of the present invention, there is provided a computer-readable recording medium having embodied thereon a computer program for executing the method of using the flexible bandwidth through the BS in the OFDMA-based cognitive radio system.

According to another aspect of the present invention, there is provided computer-readable recording medium having embodied thereon a computer program for executing the method of using the flexible bandwidth through the CPE in the OFDMA-based cognitive radio system.

Advantageous Effects

According to the present invention, fractional bands and an empty band including a bundle of fractional bandwidths can be flexibly and efficiently used. Also, maximized spectrum efficiency and a flexible data speed can be achieved at a lower complexity in a cognitive radio system having confined frequency resources.

DESCRIPTION OF THE DRAWINGS

FIG. 2 illustrates a relationship between the number of bonded channel bands and a Fourier Transform (FT) size when an OFDMA-based cognitive radio system of an embodiment of the present invention uses a bundle of four broadcast channel bands.

FIGS. 3A through 3C illustrate orthogonal frequency division multiple access (OFDMA) parameters necessary for flexibly using empty fractional bands, with respect to FFT sizes of 1K, 2K, 4K, and 8K, according to embodiments of the present invention.

FIGS. 4A through 4C illustrate orthogonal frequency division multiple access (OFDMA) parameters necessary for flexibly using empty fractional bands, with respect to FFT sizes of 1K, 2K, 4K, and 6K, according to another embodiments of the present invention.

FIG. 5 illustrates a start position of a fractional band based on a largest broadcast channel bandwidth of 8 MHz.

FIG. 8 illustrates a method of inserting information regarding 36 kinds of fractional bandwidth modes illustrated in FIG. 6 into a preamble.

FIGS. 9A through 9C illustrate methods of inserting channel bonding information into preambles, in regard to methods of bonding a plurality of channels according to an embodiment of the present invention.

MODE OF THE INVENTION

Figure 1A:
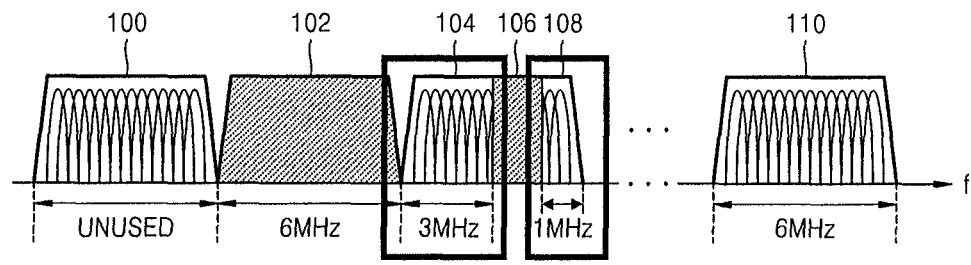
FIGS. 1A through 1E illustrate channel bands flexibly used by a base station (BS) and customer premises equipment (CPE) of an OFDMA-based cognitive radio system according to an embodiment of the present invention.

Hereinafter, the present invention will be described in detail with reference to the attached drawings.

The present invention provides technology for flexibly using a bandwidth by a base station (BS) and customer premises equipment (CPE) of a secondary user in a multi-FA (Frequency Assignment) system. The technology is a method of using an empty fractional band besides bonded channel bands in an orthogonal frequency division multiple access (OFDMA)-based cognitive radio system so as to maximize use efficiency of a spectrum. A fractional band may be used by itself or may be bonded to a broadcast channel band. Thus, technology suggested for use in a cognitive radio system frequently generating a fractional band may be used to maximize use efficiency of a spectrum.

In order to aid understanding, an IEEE802.22 wireless regional area network (WRAN) system may be described as an example to provide a service to a cognitive radio user as a secondary user, wherein the broadcast channel bandwidths 6, 7, and 8 MHz are not used as broadcast frequency bands in very high frequency (VHF)/ultra high frequency (UHF) bands.

FIGS. 1A through 1E illustrate channel bands flexibly used by a base station (BS) and customer premises equipment (CPE) of an OFDMA-based cognitive radio system according to an embodiment of the present invention. Here, broadcast channel bands are 6 MHz.

Referring to FIGS. 1A through 1E, reference numerals 102, 106, 120, 126, 140, 144, 150, 165, and 172 denote channel bands which are being used, and reference numerals 100, 104, 108, 110, 122, 124, 142, 146, 148, 163, and 174 denote channel bands which are not currently being used. The channel bands 102, 106, 120, 126, 140, 144, 150, 165, and 172 are shadowed and currently being used by CPE of a primary user or CPE of a secondary user belonging to an OFDMA-based cognitive radio system of the present invention. Information illustrated in FIGS. 1A through 1E may be obtained based on a result of sensing a spectrum using a system of the secondary user, i.e., the OFDMA-based cognitive radio system of an embodiment of the present invention.

FIG. 1A illustrates a method of allocating empty fractional bands to the secondary user. Referring to FIG. 1A, bandwidths 3 MHz and 1 MHz of empty fractional bands 104 and 108 of each broadcast channel band having a bandwidth of 6 MHz are allocated to the secondary user so as to be able to flexibly use bandwidths.

In general, when primary user occupies a fraction of a bandwidth of a broadcast channel band, or secondary user is not able to access a fraction of a channel bandwidth so as not to interfere with adjacent channels, the existing cognitive radio system may not use the rest of the channel bandwidth. However, in an embodiment of the present invention, an empty fractional band can be effectively used without affecting an allowed system of a primary user. A reduction in interference between adjacent channels will be described later with reference to FIGS. 1D and 1E.

Figure 1B:
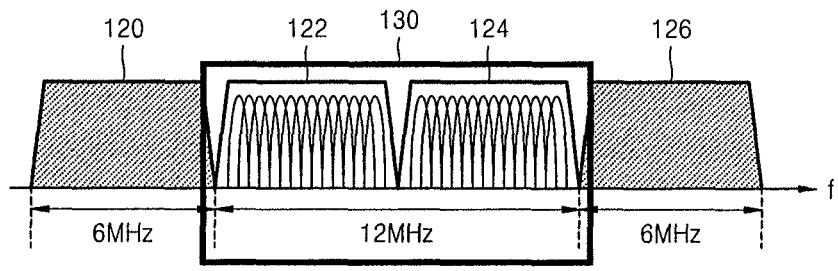

FIG. 1B illustrates a method of allocating a bundle of a plurality of empty broadcast channel bands. Referring to FIG. 1B, two broadcast channel bands 122 and 124 (each having a bandwidth of 6 MHz) are bonded to form a channel band 130 having a bandwidth of 12 MHz, and the channel band 130 is allocated to the secondary user so as to be able to flexibly use a bandwidth. If several empty channel bands are bonded and used, a high-speed data service may be provided to a secondary user.

Figure 1C:
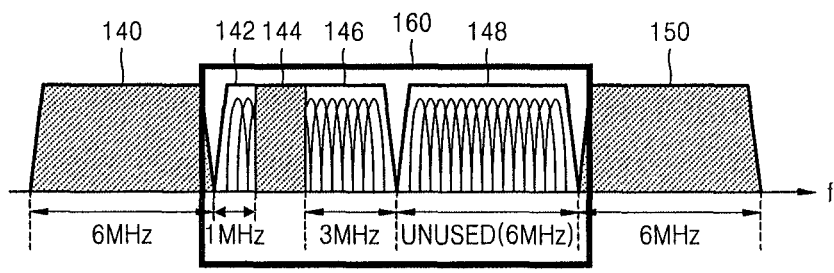

FIG. 1C illustrates a method of binding fractional bands and a broadcast channel band and allocating the bonded band to a secondary user. A fractional band 146 is bonded with a broadcast channel band 148 having a bandwidth of 9 MHz, and then allocated to a secondary user so as to be able to flexibly use a bandwidth. Fractional bands 142 and 146 may be bonded together and then allocated to the secondary user. Alternatively, the fractional bands 142 and 146 may be bonded with the broadcast channel band 148 so as to form a channel band 160, and the channel band 160 is allocated to the secondary user. Thus, it will be understood by those of ordinary skill in the art that the fractional bands 142 and 146 and the broadcast channel band 148 may be allocated and bonded using various methods.

Figure 1D:
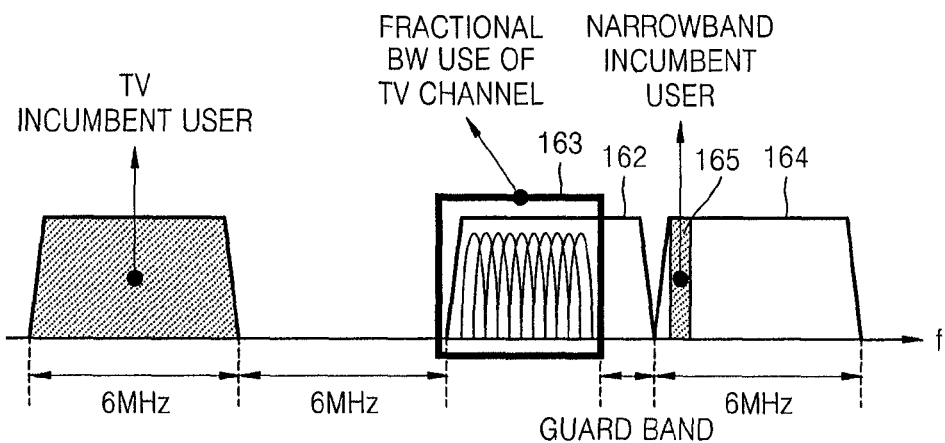

FIG. 1D illustrates a method of reducing the interference with the adjacent incumbent user. If a narrowband incumbent user (IU) in a narrowband 165 is positioned in a broadcast channel band 164, which is partially being occupied by narrowband incumbent user (IU) in a narrowband 165, a system of a secondary user uses only the fractional band 163 of the broadcast channel band 162 in consideration of a guard band for reducing interference with the adjacent narrowband IU in a narrowband 165. The system of the secondary user cannot use an entire fraction of the broadcast channel band 162 due to a concern about the interference with the adjacent narrowband IU in a narrowband 165. However, according to the present embodiment, the fractional band 163 may be effectively used without interfering with the adjacent narrowband IU in a narrowband 165.

Figure 1E:
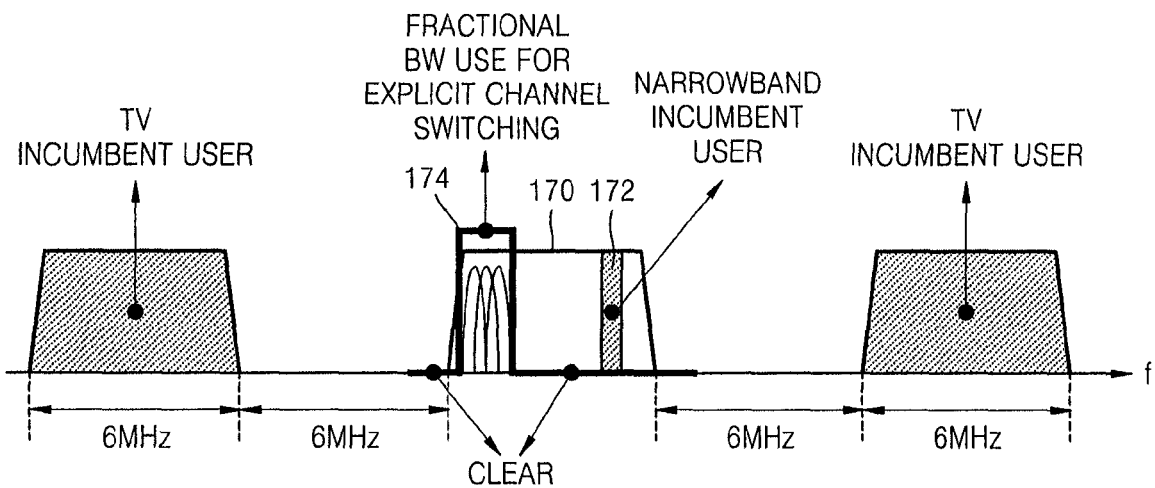

FIG. 1E illustrates a method of using a fractional bandwidth of an explicit signaling channel for switching a channel. Referring to FIG. 1E, when a secondary user uses an entire fraction of a broadcast channel band 170, a narrowband IU appears in a narrowband 172.

In this case, the secondary user must empty the broadcast channel band 170, which is being used for the narrowband IU and then move to another broadcast channel band (not shown) which is not being used. In general, a channel move time is less than or equal to 2 seconds.

Emptying a currently used channel and moving to another channel is called channel switching. To perform channel switching, first and second messages must be exchanged between a BS and CPE of the secondary user. Here, the first message is to request to change channel A to channel B, and the second message is to response the fact that channel A has been changed into channel B according to the first message.

Thus, the explicit channel switching information such as first and second messages must be exchanged during the channel move time. In an existing method, the explicit channel switching information is exchanged through the broadcast channel band 170 during the channel move time. However, in the method of the present embodiment, the explicit channel switching information is exchanged through only a fractional band 174 of the broadcast channel band 170. Thus, interference affecting the narrowband IU such as a part 74 device appearing in the broadcast channel band 170 is more reduced than in the existing method.

In other words, as shown in FIGS. 1A through 1E, a method of flexibly using an empty channel band in the OFDMA-based cognitive radio system may be classified into two methods. In the first method, a broadcast channel band or a fraction of the broadcast channel band is allocated as a channel band for the CPE of a secondary user. In the second method, broadcast channel bands or a plurality of fractions of a broadcast channel band are bonded to form a channel band, and the channel band is allocated as a channel band for the CPE of a secondary user. In the first method, various channel bands can be flexibly used depending on bandwidths of fractional bands and positions of frequency phases in a broadcast channel band. In the second method, various channel bands can be flexibly used depending on bandwidths of fractional bands, positions of frequency phases in a broadcast channel band, and the number of bonded channel bands.

In the specification, for convenience, a unit of a minimum bandwidth of a fractional band is referred to as a bandwidth resolution. In other words, the bandwidth resolution indicates a minimum bandwidth used in the OFDMA-based cognitive radio system of the present invention. If the bandwidth resolution is 1 MHz, and four broadcast channel bands each having a bandwidth of 6 MHz are used, the OFDMA-based cognitive radio system of an embodiment of the present invention may allocate various channel bands having bandwidths 1 MHz, 2 MHz, through to 23 MHz, and 24 MHz and various frequency positions of the bandwidths to a secondary user.

FIG. 2 illustrates a relationship between the number of bonded channel bands and the size of Fourier Transform (FT) when an OFDMA-based cognitive radio system of an embodiment of the present invention uses a bundle of four broadcast channel bands. Here, FT is generally a Fast Fourier Transform (FFT) which is advantageous in terms of realization complexity but the FT is not necessarily limited to an FFT. A Discrete Fourier Transform (DFT) may also be used.

When the number of bonded channel bands is "1," the size of the FFT may be within a range between 1K and 8K.

If the number of bonded channel bands is "2," and a basic FFT size is 1K, an FFT size of 2K may be used to maintain a fixed interval of sub-carriers. If the basic FFT size is 2K, an FFT size of 4K may be used to maintain a fixed interval of sub-carriers. If the basic FFT size is 4K, an FFT size of 8K may be used to maintain a fixed interval of sub-carriers. If the basic FFT size is 8K, an FFT size is not available. Here, the basic FFT size is defined as an FFT size which is used for single broadcast channel band.

Even when the number of bonded channel bands is "3" and "4," the above-described method is applied.

Referring to FIG. 2, an FFT is performed once on a plurality of bonded channel bands. Alternatively, the FFT may be performed several times. For example, the FFT may be performed four times on a channel band formed of a bundle of four broadcast channels at the FFT size of 2K or two times at the FFT size of 4K. However, if the FFT is performed several times, null sub-carriers must be included between bonded channel bands. Thus, the FFT may be inefficient in terms of the use of a spectrum. A method of controlling several outputs of the FFT may be complicated. For this reason, the method of performing the FFT once in order to flexibly use a channel bandwidth has been described with reference to FIG. 2. However, it will be understood by those of ordinary skill in the art that a method of performing an FFT several times may be applied.

In the embodiment described with reference to FIGS. 1A through 1E, a fractional band of a broadcast channel band is use. A partial FFT may be easily performed on the fractional band. In other words, as shown in FIG. 2, only a fraction of an output of the FFT may be selectively output in order to support a fractional band.

FIGS. 3A through 3C illustrate OFDMA parameters that are necessary for flexibly using empty fractional bands, with respect to FFT sizes of 1K, 2K, 4K, and 8K, according to embodiments of the present invention.

FIGS. 4A through 4C illustrate OFDMA parameters that are necessary for flexibly using empty fractional bands, with respect to FFT sizes of 1K, 2K, 4K, and 6K, according to another embodiments of the present invention.

Referring to FIGS. 3A through 3C, a sampling factor is fixed while a sampling frequency varies in each of broadcast channel band bandwidths of 6, 7, and 8 MHz. Referring to FIGS. 4A through 4C, the sampling factor varies while the sampling frequency is fixed in each of the broadcast channel bandwidths of 6, 7, and 8 MHz. In this case, it is assumed that the ratio of a guard interval time to an FFT time is 1:4.

OFDMA parameters for the broadcast channel bandwidth of 6 MHz will now be described with reference to FIG. 3A. The sampling factor suitable for a bandwidth of the broadcast channel band is selected so as to determine the sampling frequency. If the sampling factor is 8/7, the sampling frequency is constantly maintained at 48/7 MHz regardless of the FFT size and a fractional bandwidth. Thus, sub-carrier spacing is respectively 6.696 kHz, 3.348 kHz, 1.674 kHz, and 0.837 kHz with respect to the FFT size of 1K, 2K, 4K, and 8K as shown in FIG. 3A. A number of sub-carriers used in a fractional band having a bandwidth k times a bandwidth resolution is defined as 140*k, 280*k, 560*k, and 1120*k with respect to a basic FFT size of 1K, 2K, 4K, and 8K, wherein the number of sub-carriers is proportional to a bandwidth of a fractional band. In other words, if the basic FFT size is 1K, 2K, 4K, and 8K, the number of used sub-carriers within the bandwidth resolution is defined as 140, 280, 560, and 1120. If the bandwidth of the fractional band is k times the bandwidth resolution, the constant is multiplied by k so that the number of used sub-carriers in the fractional band is proportional to the bandwidth of the fractional band.

Even if the bandwidth of the broadcast channel band is 7 MHz as shown in FIG. 3B or 8 MHz as shown in FIG. 3C, the sampling factor is 8/7. However, the number of used sub-carriers within the bandwidth resolution corresponding to the FFT size of 1K, 2K, 4K, or 8K is defined as the constant of 120, 240, 480, or 960 in the embodiment illustrated in FIG. 3B but as the constant of 105, 210, 420, or 840 in the embodiment illustrated in FIG. 3C, so that the number of used sub-carriers within the broadcast channel bandwidth is equal to that illustrated in FIG. 3A. In this case, the number of used sub-carriers for the FFT size of 1K is always fixed as 140*6=120*7=105*8. Thus, the number of used sub-carriers within the broadcast channel band is kept constant regardless of the bandwidth of the broadcast channel band. In other words, such a constant is selected so that the total number of used sub-carriers is equal at bandwidths of 6, 7, and 8 MHz of a broadcast channel band. The total number of used sub-carriers is 840, 1680, 3360, or 6720 at a basic FFT size of 1K, 2K, 4K, or 8K, respectively, regardless of the bandwidth of the broadcast channel band.

The OFDMA parameters as defined above are characterized in that the total number of used sub-carriers is maintained constant regardless of the bandwidth of a broadcast channel band for equally applying a sub-channel allocation rule. The OFDMA parameters according to the embodiments illustrated in FIGS. 3A through 3C are characterized in that a sampling frequency varies with a bandwidth of a broadcast channel band while a number of used sub-carriers is equal so as to maintain use efficiency of a band constant. Thus, a sampling frequency must vary in a nation using a different type of channel bandwidth. However, an identical sub-channel constitution method may be applied in all nations.

The OFDMA parameters according to an embodiment illustrated in FIGS. 4A through 4C are characterized in that a sampling frequency does not vary regardless of a bandwidth of a broadcast channel band while the number of used sub-carriers varies with the bandwidth of the broadcast channel band in order to maintain use efficiency of a band constant. Thus, a cognitive radio system using an identical sampling frequency may be used in a nation using broadcast channel bands having different bandwidths. However, a sub-channel constitution method must vary. The OFDMA parameters defined above are set so that intervals of sub-carriers are maintained constant regardless of the bandwidth of the broadcast channel band at an identical FFT size in order to maintain a robustness of frequency offset constant regardless of the bandwidth of the broadcast channel band.

FIG. 5 illustrates a start position of a fractional band based on the largest broadcast channel bandwidth of 8 MHz. It is assumed that a bandwidth resolution is 1 MHz. Referring to FIG. 5, reference numerals 500, 510, through to 570 denote bands. Two bands, which are not adjacent to each other, e.g., the bands 510 and 560, are bonded and then allocated to a secondary user. For convenience, it will be described that only adjacent bands are bonded and then allocated to the secondary user. In other words, positions of available fractional bands may be adjacent to each other or may be separated from each other. For convenience, if fractional bands are adjacent to each other at all times, 8 kinds of bandwidths of an available fractional band exist. When the OFDMA parameters for a broadcast channel bandwidth of 8 MHz are defined as illustrated in FIG. 3C, a real bandwidth illustrated in FIG. 5 is about 9.142 MHz, and a real bandwidth resolution for a bandwidth resolution of 1 MHz is 0.937 MHz. Since a sampling factor is 8/7, a used sub-carrier is defined to substantially occupy a band 9.142 MHz, which is slightly greater than the broadcast channel bandwidth of 8 MHz and satisfies a 93.7% use efficiency of a band. Thus, a fractional bandwidth occupied by the used sub-carrier is 0.937 MHz of 1 MHz. As a result, the fractional band has 8 kinds of bandwidths 1, 2, 3, 4, 5, 6, 7, and 8 MHz and 8 kinds of start positions 0, 1, 2, 3, 4, 5, 6, and 7 as illustrated in FIG. 5. Therefore, combinations between the bandwidth and a frequency position (start position in the present embodiment) of the fractional band may be as many as 64. However, when the bandwidth of the fractional band is 8 MHz, the start position of the fraction band may be 1 as illustrated in FIG. 5. When the bandwidth of the fractional band is 7 MHz, the start position is 1 and 2 as illustrated in FIG. 5. Thus, only 36 kinds of methods may be substantially adopted.

Figure 6:
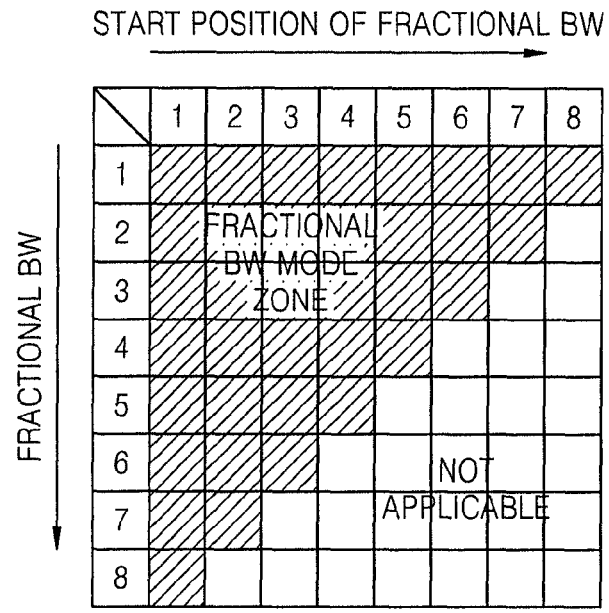
FIG. 6 illustrates a various fractional bandwidth modes, with respect to fractional bandwidth and start position of a fractional band illustrated in FIG. 5.

FIG. 6 illustrates a various fractional bandwidth modes, with respect to fractional bandwidth and start position of a fractional band illustrated in FIG. 5. In other words, a channel band having a bandwidth that is a natural number times a bandwidth resolution belonging to the broadcast channel band is allocated to a secondary user. However, 36 kinds of fractional bandwidth modes using methods obtained by allocating only adjacent channel bands are expressed using fractional bandwidths and start positions of fractional bandwidths. A shadowed part denotes 36 fractional bandwidth modes which may be used by the OFDMA-based cognitive radio system of an embodiment of the present invention under the above-described conditions. Also, a horizontal axis denotes the start position of each of the fractional bandwidth modes, and a vertical axis denotes a fractional bandwidth of each of the fractional bandwidth modes.

If a channel band which is not adjacent within the broadcast channel band is allocated to the secondary user, much more fractional bandwidth modes may exist than are illustrated with reference to FIGS. 5 and 6.

Figure 7:
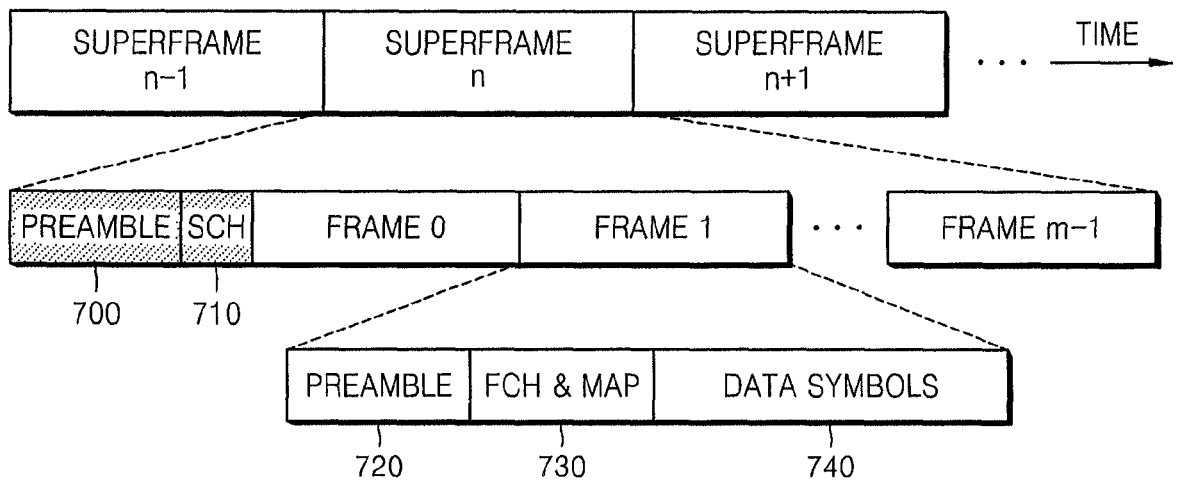
FIG. 7 illustrates a downlink frame structure which can be applied to an OFDMA-based signal used in a cognitive radio system according to an embodiment of the present invention.

FIG. 7 illustrates a downlink frame structure which can be applied to an OFDMA-based signal used in an OFDMA-based cognitive radio system according to an embodiment of the present invention. The downlink frame illustrated in FIG. 7 includes super frames and frames. The super frame includes a preamble 700, a super frame control header (SCH) 710, and m frames. Each of the m frames includes at least one data symbol 740, a preamble having at least one symbol, and a symbol 730 corresponding to a frame control header (FCH) and message (MAP).

User CPE belonging to the OFDMA-based cognitive radio system of an embodiment of the present invention must effectively detect a method of using a bandwidth, wherein the method is changed during power on of the OFDM-based cognitive radio system or communications. In other words, the CPE must detect fractional bandwidth mode information of a currently allocated channel band from 36 fractional bandwidth modes as illustrated in FIGS. 5 and 6.

The OFDMA-based cognitive radio system of an embodiment of the present invention includes band allocation information regarding the allocated channel band in the preamble 700 or 720 of an OFDMA-based signal and then transmits the band allocation information to the CPE or includes the band allocation information in the preamble 700 or 720 and a control header and then transmits the band allocation information to the CPE. The CPE receives the OFDMA signal including the band allocation information to detect information regarding the allocated channel band. In this case, the control header corresponds to the SCH 710 and the FCH 730 in an embodiment of the present invention.

In this case, the band allocation information includes fractional bandwidth mode information. If the OFDMA-based cognitive radio system allocates a bundle of channels, the band allocation information may also include channel bonding information. The fractional bandwidth mode information may include bandwidth information and band position information. The bandwidth information and the band position information may be respectively the fractional bandwidth and the start position of the fractional bandwidth illustrated in FIG. 6. Also, the channel bonding information refers to information regarding a plurality of broadcast channel bands bonded and allocated to a secondary user. In detail, the band allocation information basically includes bandwidth information of a fractional band of each broadcast channel band and frequency position information of the fractional band. If a plurality of a whole or a fraction of broadcast channel bands are bonded and used as the allocated channel band, the band allocation information must include channel bonding information regarding a method of bonding the broadcast channel bands.

FIG. 8 illustrates a method of inserting 36 kinds of fractional bandwidth mode information illustrated in FIG. 6 into a preamble.

Contents in the first column on the left denote indices corresponding to fractional bandwidth modes, the second and third column of contents denote fractional bandwidths and start positions of fractional bandwidth, and the last column of contents denote preamble sequences corresponding to the fractional bandwidth modes on a one-to-one basis. In particular, the preamble sequences illustrated in FIG. 8 are pseudo noise (PN) sequences but are not limited to this.

The fractional bandwidth modes respectively correspond to the indices including values from "0" to "35," and the indices correspond to fractional bandwidths and start positions of the fractional bandwidths on a one-to-one basis. In this case, the fractional bandwidths correspond to the above-described bandwidth information, and the start positions correspond to the above-described position information.

A BS of the OFDMA-based cognitive radio system of an embodiment of the present invention inserts a preamble sequence specifying a fractional bandwidth mode into the preamble 700 or 720 so as to insert information regarding a channel band allocated to the secondary user into an OFDMA-based signal. CPE detects the preamble sequence or a preamble sequence index from the preamble 700 or 720 inserted into the OFDMA-based signal and then a channel band (in detail, bandwidth information, position information) currently allocated thereto based on the detection result. In other words, referring to FIG. 8, the OFDMA-based cognitive radio system allocates different preamble sequences to different flexible bandwidth using methods on a one-to-one basis. A preamble sequence may be designed to minimize a peak-to-average power ratio (PAPR).

The BS may generate the preamble sequence using various methods, i.e., a method of storing a preamble sequence in a memory in advance and then reading the preamble sequence, a method of generating a preamble sequence using a generator polynomial, etc. In the former method, a PAPR is superior, but all of the preamble sequences must be stored in the memory. In the latter method, a memory storing preamble sequences is not required, and preamble sequences can be easily generated whenever necessary. However, it is difficult to optimize a PAPR. Equation 1 is an $11^{th}$-order generator polynomial.

$$g(x)=x^{11}+x^2+1 \tag{1}$$

A maximum order of the generator polynomial illustrated in Equation 1 is 11, and a period of the generator polynomial is 2047. Thus, the BS uses 36 of 2047 in the above-described embodiment.

Figure 9C:
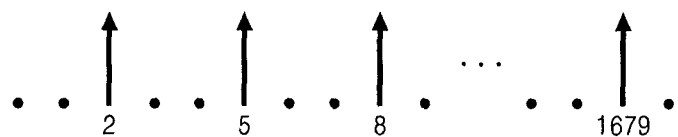

FIGS. 9A through 9C illustrate methods of inserting channel bonding information into a preamble, in regard to a method of bonding a plurality of channels. In the methods, elements and nulls of a preamble sequence are inserted into sub-carriers of the preamble at fixed periods in order to obtain a repetition characteristic of the preamble. CPE detects a flexible bandwidth information using method having the repetition characteristic.

FIG. 9A illustrates a method of inserting an element of a preamble sequence into each sub-carrier at every three sub-carrier interval starting from a zero$^{th}$ sub-carrier according to an embodiment of the present invention. FIG. 9B illustrates a method of inserting an element of a preamble sequence into each sub-carrier at every three sub-carrier interval starting from a first sub-carrier according to an embodiment of the present invention. FIG. 9C illustrates a method of inserting an element of a preamble sequence into each sub-carrier at every three sub-carrier staring from a second sub-carrier according to an embodiment of the present invention. Nulls are inserted into sub-carriers into which elements of the preamble sequence are not inserted.

A case where an OFDMA-based cognitive radio system uses three broadcast channel bands will now be described. If a channel band allocated to user CPE includes three broadcast channel bands, a BS inserts a preamble sequence into the preamble 700 or 720 of an OFDMA-based signal using the method illustrated in FIG. 9A. If the channel band allocated to the user CPE includes two broadcast channel bands, the BS inserts a preamble sequence into the preamble 700 or 720 of the OFDMA-based signal using the method illustrated in FIG. 9B. If the channel band allocated to the user CPE includes one broadcast channel band, the BS inserts a preamble sequence into the preamble 700 or 720 of the OFDMA-based signal using the method illustrated in FIG. 9C. Next, the user CPE detects preamble sequence insertion patterns as illustrated in FIGS. 9A through 9C from the preamble of the OFDMA-based signal in order to detect whether the channel band allocated thereto includes what number of a whole or a fraction of broadcast channel bands. FIGS. 9A through 9C illustrate preamble sequence insertion patterns, and FIG. 8 illustrates the contents of inserted preamble sequences. Band allocation information regarding allocated channel bands as illustrated in FIGS. 1A through 1C may be included by using combinations of the preamble sequence insertion patterns and the contents of the preambles.

In FIGS. 8 and 9A through 9C, an FFT size is 2K, and the modulation method is BPSK. Thus, the number of bits of a preamble is equal to the number of sub-carriers illustrated in FIGS. 3A through 3C, i.e., 1680.

Figure 10:
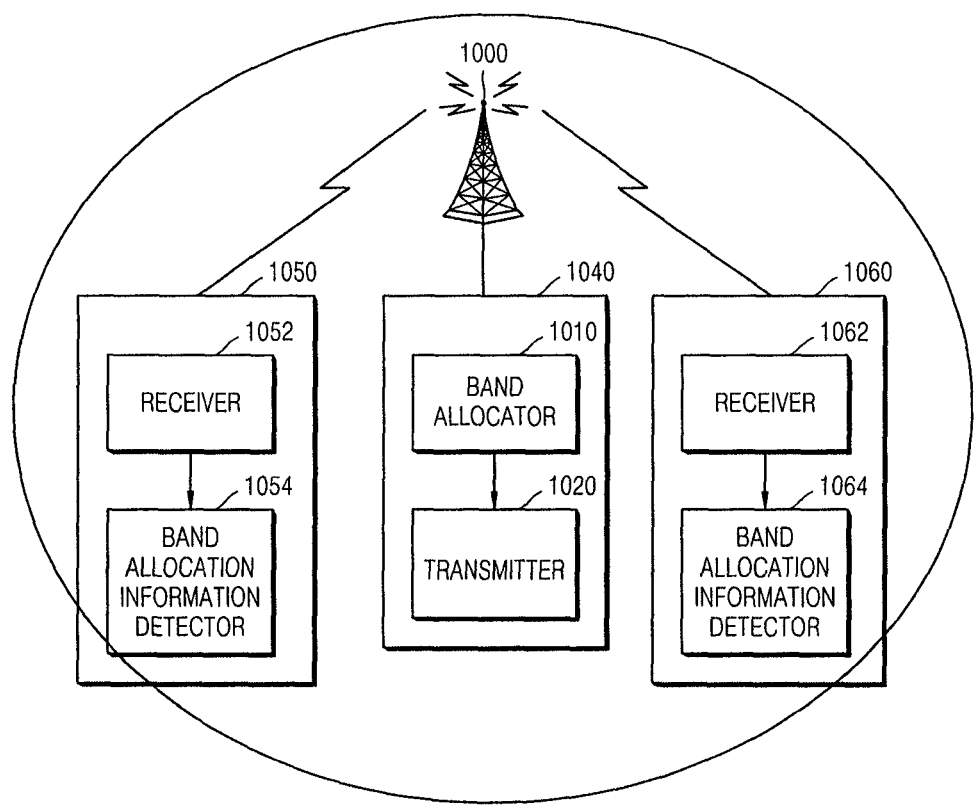
FIG. 10 illustrates an OFDMA-based cognitive radio system using a flexible bandwidth according to an embodiment of the present invention.

FIG. 10 illustrates an OFDMA-based cognitive radio system using a flexible bandwidth according to an embodiment of the present invention. Referring to FIG. 10, the OFDMA-based cognitive radio system includes a BS 1000, a first user CPE 1050, and a second CPE 1060. It is assumed that a flexible channel has been allocated to the first CPE 1050 and used, and a channel band is to be allocated to the second user CPE 1060.

The BS 1000 includes an apparatus 1040 using a flexible bandwidth. The apparatus 1040 includes a band allocator 1010 and a transmitter 1020. The first and second user CPEs 1050 and 1060 include receivers 1052 and 1062 and band allocation information detectors 1054 and 1064, respectively.

The receivers 1052 and 1062 receive an OFDMA-based signal, and the band allocation information detectors 1054 and 1064 detect band allocation information from the received OFDMA-based signal. Here, examples of the band allocation information may include fractional bandwidth mode information and channel bonding information, which will be described later.

The band allocator 1010 allocates all fractions or fractions of unused bands to CPE. Unused bands 100, 104, 108, 110, 122, 124, 142, 146, 148, 163, and 174 are illustrated in FIGS. 1A through 1E. Used bands 102, 106, 120, 126, 140, 144, 150, 165, and 172 illustrated in FIGS. 1A through 1E are used by an IU (not shown) or the first user CPE 1050.

The band allocator 1010 allocates a broadcast channel band or a fraction of the broadcast channel band as a channel band for the second user CPE 1060 or allocates a channel band formed by bonding broadcast channel bands or a plurality of fractions of the broadcast channel bands as a channel band for the second user CPE 1060.

The transmitter 1020 transmits an OFDMA-based signal including the band allocation information regarding the allocated channel band. If the allocated channel band includes a plurality of bonded channel bands, the transmitter 1020 may perform an FT once or a plurality of times in order to generate the OFDMA-based signal or may perform a partial FFT in order to support fractional bands.

The OFDMA-based signal may be generated using the OFDMA parameters illustrated in FIGS. 3A through 3C and FIGS. 4A through 4C. In other words, the transmitter 1020 may set OFDMA parameters so that the total number of used sub-carriers within a broadcast channel band using an identical FFT size is constant regardless of a bandwidth of the broadcast channel band as illustrated in FIGS. 3A through 3C, so as to generate the OFDMA-based signal. Alternatively, the transmitter 1020 may set OFDMA parameters so that intervals of sub-carriers of a broadcast channel band using an identical FFT size are constant regardless of a size of a bandwidth of the broadcast channel band as illustrated in FIGS. 4A through 4C, in order to generate the OFDMA-based signal. An example of a method of setting OFDMA parameters so that the total number of used sub-carriers within a broadcast channel band is constant regardless of a bandwidth of the broadcast channel band may include a method of using an identical sampling factor regardless of a bandwidth of a broadcast channel band and an FFT size and setting the total number of used sub-carriers within a bandwidth resolution to be proportional to the FFT size so as to generate an OFDMA-based signal. An example of a method of setting OFDMA parameters so that intervals between sub-carriers are equal regardless of the size of a bandwidth of a broadcast channel band using an identical FFT size may include a method of setting a sampling factor to be inversely proportional to the bandwidth of the broadcast channel band.

The transmitter 1020 must transmit the band allocation information regarding the allocated channel band to the second user CPE 1060. Examples of a method of transmitting the band allocation information may include a method of transmitting the band allocation method using a preamble inserted into the OFDMA-based signal and a method of transmitting the band allocation information using a preamble and control header included in the OFDMA-based signal. In this case, the band allocation information may include fractional bandwidth mode information and channel bonding information.

If the allocated channel band is a whole or a fraction of a broadcast channel band and the transmitter 1020 inserts a preamble sequence corresponding to fractional bandwidth mode information of the allocated channel band into a preamble of the OFDMA-based signal corresponding to a broadcast channel band to which the allocated channel band belongs, the second user CPE 1060 detects the fractional bandwidth mode information of the allocated channel band based on the preamble of the OFDMA-based signal. In this case, this is applied to the above-described two transmission methods.

If the allocated channel band is formed by bonding of a whole or a fraction of two or more broadcast channel bands, the transmitter 1020 inserts a preamble sequence corresponding to fractional bandwidth mode information of the two or more broadcast channel bands into a preamble of the OFDMA-based signal corresponding to the two or more broadcast channel bands to which the allocated channel band belongs. In this case, the preamble sequence includes channel bonding information indicating a method of bonding two or more channel bands. An example of a method of inserting channel bonding information into the preamble sequence may include a method of carrying elements of the preamble sequence in sub-carriers of the preamble of the OFDMA-based signal at predetermined intervals of sub-carriers with the positions of the sub-carriers varying as illustrated in FIGS. 9A through 9C. In this case, the second user CPE 1060 may detect a preamble sequence included in a received signal corresponding to the preamble of the OFDMA-based signal, detect fractional bandwidth mode information of the allocated channel band based on the detected preamble sequence, detect the positions of the sub-carriers carrying the elements of the preamble sequence from the preamble of the OFDMA-based signal, and detect channel bonding information based on the detected results. This method corresponds to the former of the two above-described transmission methods.

If the allocated channel band is formed by bonding of a whole or a fraction of two or more broadcast channel bands, the transmitter 1020 inserts a preamble sequence corresponding to fractional bandwidth mode information of each of the two or more broadcast channel bands into a preamble of the OFDMA-based signal corresponding to each of the two or more broadcast channel bands to which the allocated channel bands belongs and inserts channel bonding information indicating a method of bonding two or more channel bands into the SCH 710 or the FCH 730 of the OFDMA-based signal. In this case, the second user CPE 1060 may detect the preamble sequence included in the OFDMA-based signal, detect the fractional bandwidth mode information of the allocated channel band based on the detected preamble sequence, and detect channel bonding information based on the SCH 710 or the FCH 730 included in the OFDMA-based signal. This method corresponds to the latter of the two above-described transmission methods.

The second user CPE 1060 may calculate a correlation value between a preamble sequence detected from a previous preamble and the OFDMA-based signal in a current preamble position, use previously detected band allocation information as current band allocation information if the correlation value is greater than a predetermined threshold value, and calculate all correlation values between the OFDMA-based signal in the current preamble position and other preamble sequences if the correlation value is smaller than the predetermined threshold value, so as to efficiently detect information regarding the allocated channel band. An example of a period for calculating a correlation value of a preamble for detecting band allocation information may include a super frame time interval. However, the correlation value may be calculated at each preamble period at which a preamble sequence is inserted. Thus, the method of computing the period is not limited.

Figure 11:
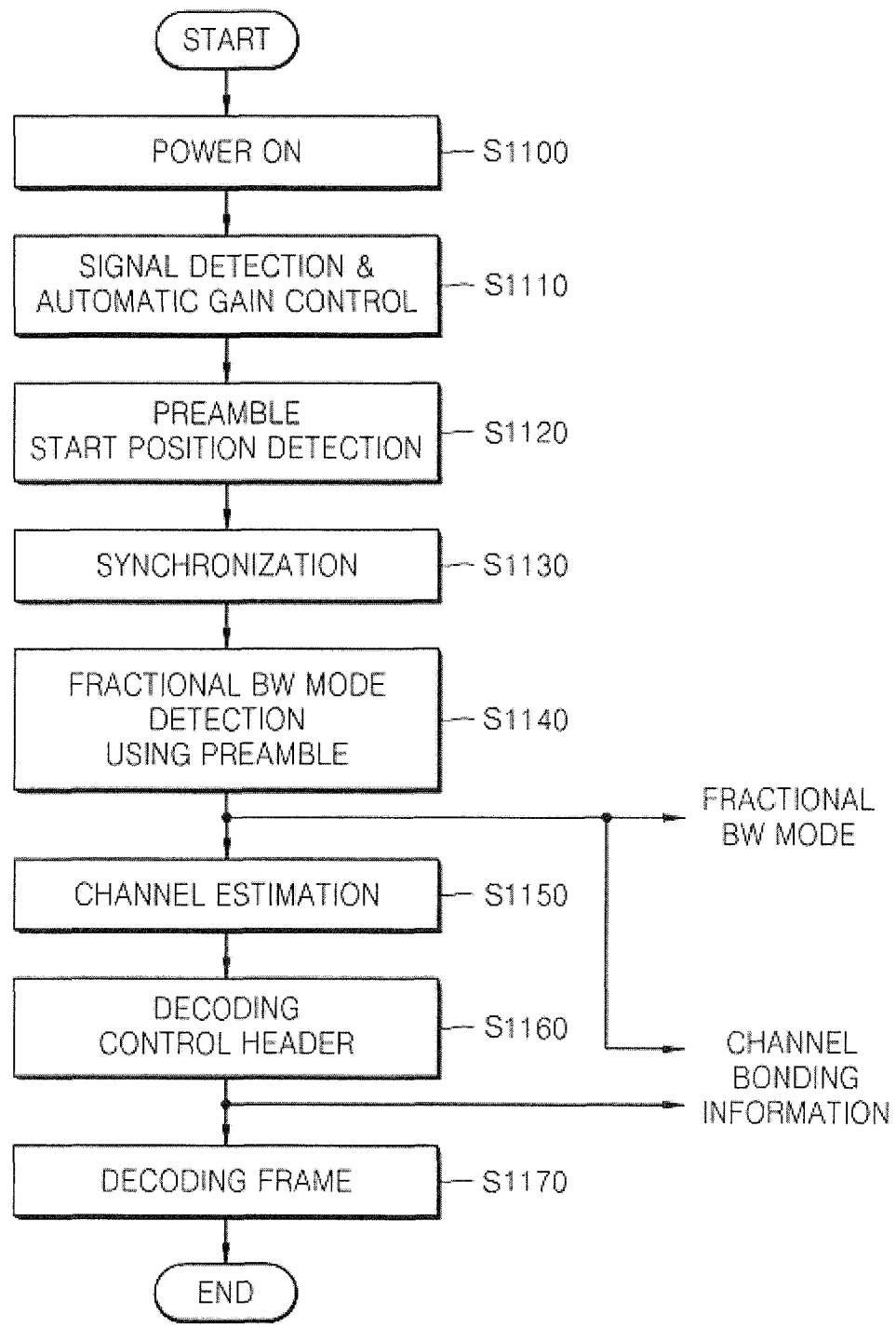
FIG. 11 is a flowchart of a method of detecting a method of using a flexible bandwidth by means of a second user CPE illustrated in FIG. 10, according to an embodiment of the present invention.

FIG. 11 is a flowchart of a method of detecting a method of using a flexible bandwidth by means of the second user CPE 1060 illustrated in FIG. 10, according to an embodiment of the present invention. Referring to FIG. 11, in operation S1100, the second user CPE 1060 is powered on by a user.

In operation S1110, the second user CPE 1060 performs signal detection and automatic gain control.

In operation S1120, the second user CPE 1060 detects a start position of a preamble from an OFDMA-based signal having a downlink frame structure as illustrated in FIG. 7. Here, the preamble is a super frame preamble or a frame preamble.

In operation S1130, the second CPE 1060 performs synchronization based on the detection result in operation S1120.

In operation S1140, the second user CPE 1060 detects fractional bandwidth mode information using the preamble included in the OFDMA-based signal. In this case, if the BS 1000 uses the former of the two above-described transmission methods, the second user CPE 1060 may also detect channel bonding information.

In operation S1150, the second user CPE 1060 performs channel estimation. In operation S1160, the second user CPE 1060 decodes an SCH or an FCH. If the BS 1000 uses the latter of the two above-described transmission methods, the second user CPE 1060 may detect the channel bonding information in operation S1160.

In operation S1170, the second user CPE 1060 restores or decodes a frame using the fractional bandwidth mode information and the channel bonding information.

Figure 12:
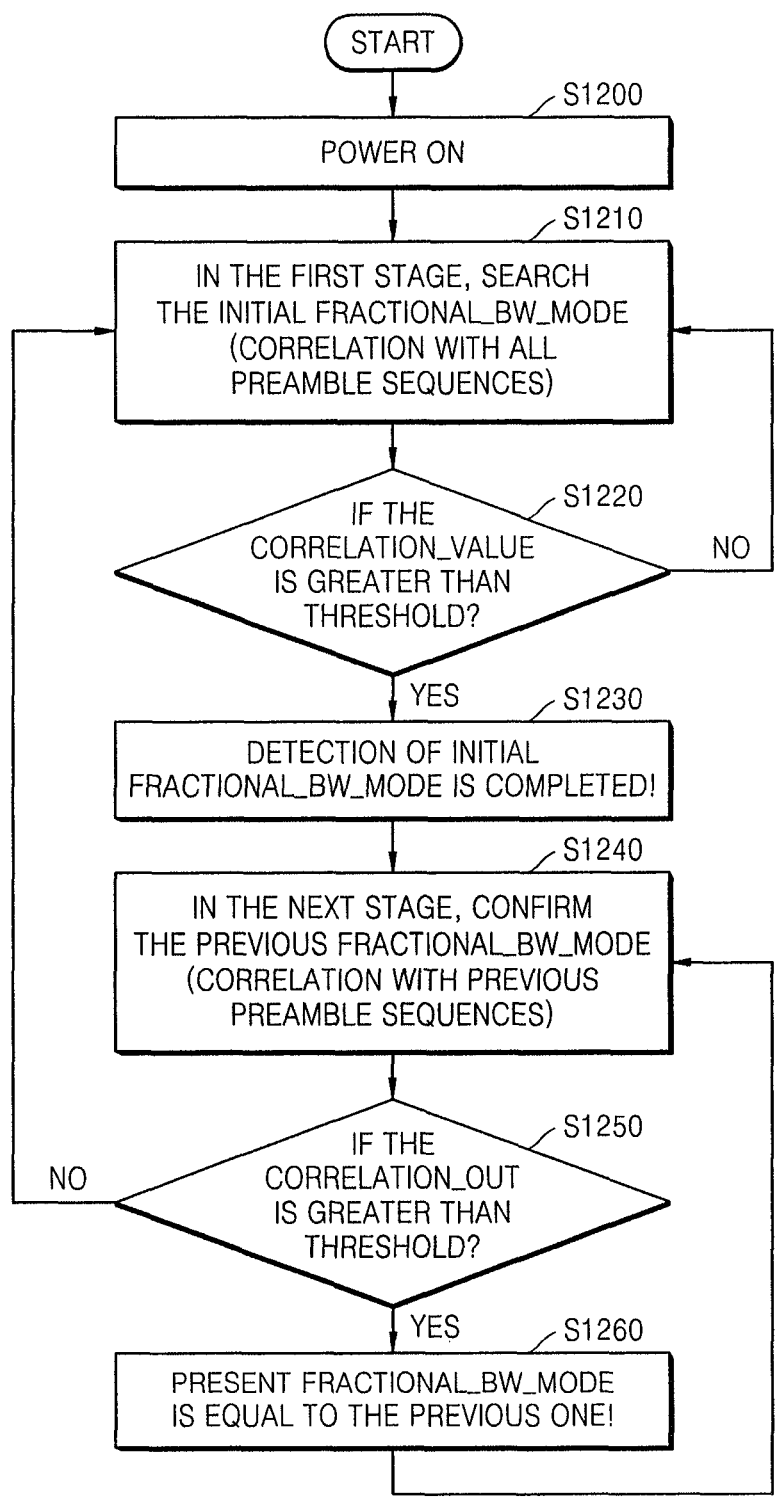
FIG. 12 is a flowchart of a method of computing correlation values of received preambles in order to detect a method of using a flexible bandwidth according to an embodiment of the present invention.

FIG. 12 is a flowchart of a method of computing correlation values of received preambles in order to detect a method of using a flexible bandwidth according to an embodiment of the present invention. In the present embodiment, a method of using a flexible bandwidth using a received signal (received preamble) corresponding to a preamble using a method illustrated in FIG. 8 is detected. If a preamble sequence insertion pattern as illustrated in FIGS. 9A, 9B, or 9C is used together, a correlation value may be calculated with positions of subcarriers that are changed.

The received preamble used for calculating the correlation value may be a received signal corresponding to a super frame preamble or a received signal corresponding to a frame preamble. Thus, it will be understood by those of ordinary skill in the art that a correlation value may be calculated in each super frame, in each frame, in every plurality of super frames, or in every plurality of frames.

For convenience, in the present embodiment, the correlation value will be calculated in each super frame.

Referring to FIG. 12, operations S1200, S1210, S1220, and S1230 are performed in order to detect a method of using a flexible bandwidth of a first stage, and operations S1240, S1250, and S1260 are performed in order to detect a detection process of a second stage using the detection result of the first stage.

In operation S1200, CPE is powered on. In operation S1210, a correlation value between a received preamble of a currently received super frame and each preamble sequence is calculated. A method of using a flexible bandwidth corresponding to a preamble sequence having a greater correlation value than a threshold value or the largest correlation value corresponds to a method of using an initial flexible bandwidth. In particular, the former method, i.e., the method of detecting the preamble sequence having a correlation value greater than the threshold value is illustrated in the present embodiment. If the currently calculated correlation value is greater than a threshold value in operation S1220, a method of using a flexible bandwidth corresponding to a preamble sequence used for computing the currently correlation value is determined as a method of using an initial flexible bandwidth in operation S1230. If the currently calculated correlation value is smaller than or equal to the threshold value in operation S1220, the process returns to operation S1210 in order to calculate a correlation value of another preamble sequence which is not used for calculating a correlation value.

The method of using the initial flexible bandwidth is detected by performing operations S1200, S1210, S1220, and S1230. The detection result in operations S1200, S1210, S1220, and S1230 is applied to the next super frames.

In operation S1240, a correlation value between a received preamble of a current super frame and a preamble sequence detected from a previous super frame is computed. If it is determined that the correlation value is greater than a threshold value in operation S1250, it is determined in operation S1260 that a method of using a flexible bandwidth of the current super frame is equal to a method of using a flexible bandwidth of the previous super frame. If the correlation value is smaller than the threshold value in operation S1250, the process returns to operation S1210 in order to obtain correlation values of all preamble sequences so as to detect a new method of using a flexible bandwidth. This method may contribute to reducing the time required for confirming the method for a time for which a method of using a flexible bandwidth is maintained equal.

Figure 13:
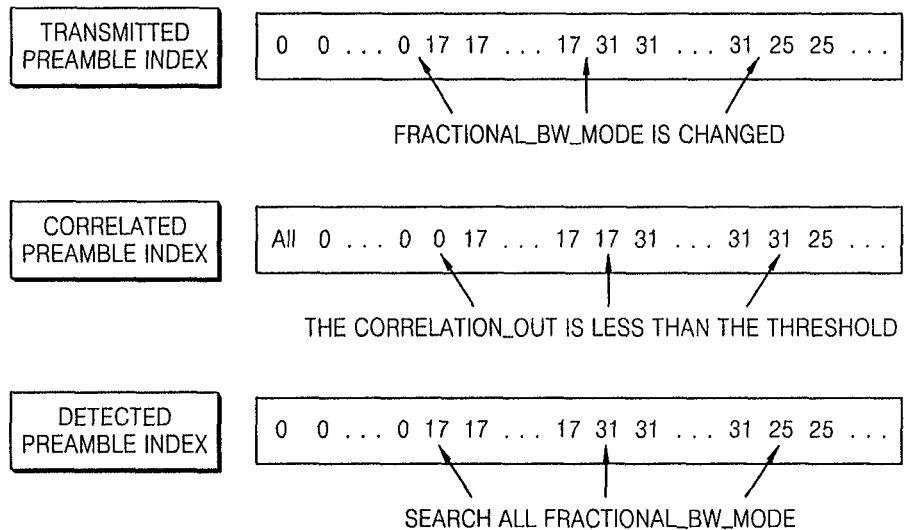
FIG. 13 illustrates an example of the method illustrated in FIG. 12.

FIG. 13 illustrates an example of the detection method illustrated in FIG. 12. When preamble indices corresponding to continuous preambles are 0, 0, . . . , 0, 17, 17, . . . , 17, 31, 31, . . . , 31, 25, 25, . . . , correlation values between a received preamble and all preamble sequences are calculated at the first stage (in operations S1200, S1210, S1220, and S1230), and only a correlation value with a preamble sequence detected immediately previously is calculated at the second stage (in operations 1240, 1250, and 1260). A correlation value is smaller than a threshold value when a band allocation method is changed. Thus, correlation values with all preamble sequences must be calculated again to detect a new band allocation method.

Figure 14:
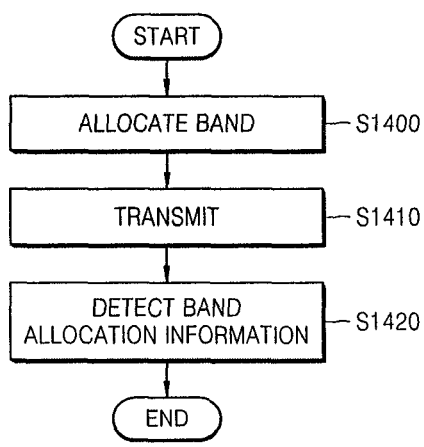
FIG. 14 is a flowchart of a method of using a flexible bandwidth in an OFDMA-based cognitive radio system according to an embodiment of the present invention.

FIG. 14 is a flowchart of a method of using a flexible bandwidth in an OFDMA-based cognitive radio system according to an embodiment of the present invention. Referring to FIG. 14, the method includes operations serially processed in the OFDMA-based cognitive radio system illustrated in FIG. 10. Thus, although omitted contents are the above-described contents of the OFDMA-based cognitive radio system illustrated in FIG. 10, the omitted contents may be applied to the method of using the flexible bandwidth according to the present embodiment.

The present embodiment will now be described with reference to FIGS. 10 and 14.

In operation S1400, the band allocator 1010 allocates a channel band from among unused channel bands for the second user CPE 1060. In this case, the band allocator 1010 may allocate a broadcast channel band or a fraction of the broadcast channel band as a channel band for the second user CPE 1060 or allocate a channel band formed by bonding broadcast channel bands or a plurality of fractions of a broadcast channel band as a channel band for the second user CPE 1060.

In operation S1410, the transmitter 1020 transmits an OFDMA-based signal including information regarding the allocated channel band. A method of including the information regarding the allocated channel band in the OFDMA-based signal, an FT method, and a method of setting OFDMA parameters are the same as those described above. Thus, detailed descriptions thereof will be omitted.

In operation S1420, the second user CPE 1060 detects fractional bandwidth mode information of the allocated channel band based on the received OFDMA-based signal. A method of detecting the fractional bandwidth mode information is the same as that described above and thus a detailed description thereof will be omitted.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While this invention has been particularly shown and described with reference to preferred embodiments thereof, it will be understood by those skilled in the art that various changes in form and details may be made therein without departing from the spirit and scope of the invention as defined by the appended Claims. The preferred embodiments should be considered in descriptive sense only and not for purposes of limitation. Therefore, the scope of the invention is defined not by the detailed description of the invention but by the appended Claims, and all differences within the scope will be construed as being included in the present invention.

The invention claimed is:

1. A BS (base station) of an OFDMA (orthogonal frequency division multiple access)-based cognitive radio system comprising:

a band allocator allocating a channel band of unused channel bands having a bandwidth that is a natural number times a bandwidth resolution to a CPE (customer premises equipment) of a secondary user, the unused channel bands being channel bands among a range of frequencies allowed to but not used by a primary user, wherein the bandwidth resolution is a predetermined bandwidth smaller than a bandwidth of a broadcast channel band; and a transmitter transmitting an OFDMA-based signal comprising a preamble sequence that comprises band allocation information indicating information regarding the allocated channel band, wherein the band allocation information comprises at least one of fractional bandwidth mode information and channel bonding information, wherein the band allocator allocates a fraction of the broadcast channel band as a channel band for the CPE according to fractional bandwidth mode information, or allocates a channel band formed by bonding together a bundle of broadcast channel bands as the channel band for the CPE according to the channel bonding information, or allocates a plurality of fractions of broadcast channel bands as the channel band for the CPE according to the channel bonding information.

2. The BS of claim 1, wherein if the allocated channel band is formed by bonding a plurality of channel bands, the transmitter performs an FFT (Fast Fourier Transform) once in order to generate the OFDMA-based signal.

3. The BS of claim 1, wherein if the allocated channel band is formed by bonding a plurality of channel bands, the transmitter performs an FFT a plurality of times to generate the OFDMA-based signal.

4. The BS of claim 1, wherein the transmitter sets OFDMA parameters so that a total number of used sub-carriers in a broadcast channel band having an identical FFT size remains constant regardless of a bandwidth of the broadcast channel band, in order to generate the OFDMA-based signal.

5. The BS of claim 4, wherein the transmitter uses a sampling factor, which remains constant regardless of a bandwidth of a broadcast channel band and an FFT size, and sets a total number of used sub-carriers within a bandwidth resolution to be proportional to the FFT size.

6. The BS of claim 1, wherein the transmitter sets OFDMA parameters so that intervals among sub-carriers within a broadcast channel band having an identical FFT size are equal to each other regardless of a bandwidth of the broadcast channel band, in order to generate the OFDMA-based signal.

7. The BS of claim 6, wherein the transmitter sets a sampling factor to be proportional to a bandwidth of a broadcast channel band.

8. The BS of claim 1, wherein when the allocated channel band is an entire broadcast channel band or a fraction of a broadcast channel band, then the preamble sequence-which corresponds to fractional bandwidth mode information of the allocated channel band is inserted by the transmitter into a preamble of the OFDMA-based signal corresponding to the broadcast channel band to which the allocated channel band belongs, wherein the fractional bandwidth mode information comprises bandwidth information and band position information of the allocated channel band.

9. The BS of claim 1, wherein when the allocated channel band is formed by bonding all fractions or fractions of two or more broadcast channel bands, then the preamble sequence which corresponds to fractional bandwidth mode information of each of the two or more broadcast channel bands as an insertion pattern corresponding to a method of bonding two or more channel bands is inserted by the transmitter into a preamble of the OFDMA-based signal corresponding to each of the two or more broadcast channel bands to which the allocated channel band belongs.

10. The BS of claim 9, wherein the transmitter changes positions of sub-carriers carrying elements of the preamble sequence depending on the method of the bonding the two or more channel bands so as to carry the elements of the preamble sequence in sub-carriers of the preamble of the OFDMA-based signal at predetermined intervals of sub-carriers and carry nulls in other sub-carriers.

11. The BS of claim 1, wherein when the allocated channel band is formed by bonding all fractions or fractions of two or more broadcast channel bands, then the preamble sequence which corresponds to fractional bandwidth mode information of each of the two or more broadcast channel bands is inserted by the transmitter into a preamble of the OFDMA-based signal corresponding to each of the two or more broadcast channel bands to which the allocated channel band belongs and channel bonding information indicating a method of bonding two or more channel bands is inserted by the transmitter into a control header of the OFDMA-based signal.

12. The BS of any one of claims 9 through 11, wherein the preamble sequence is a sequence designed to minimize a PAPR (peak-to-average power ratio)

13. A CPE (customer premises equipment) of an OFDMA (orthogonal frequency division multiple access)-based cognitive radio system comprising:
a receiver receiving an OFDMA-based signal comprising a preamble sequence that comprises band allocation information indicating information regarding a channel band allocated from a BS (base station) to a secondary user; and
a band allocation information detector detecting the band allocation information based on the received OFDMA-based signal,
wherein the band allocation information indicating information regarding the allocated channel band,
wherein the allocated channel band is a channel band of unused channel bands having a bandwidth that is a natural number times a bandwidth resolution, the unused channel bands being channel bands among a range of frequencies allowed to but not used by a primary user,
wherein the allocated channel band comprises:
a fraction of a broadcast channel band as the channel band for the CPE according to fractional bandwidth mode information, or
bonding together a bundle of broadcast channel bands as the channel band for the CPE according to the channel bonding information, or
a plurality of fractions of a broadcast channel bands as the channel band for the CPE according to the channel bonding information,
wherein the bandwidth resolution is a predetermined bandwidth smaller than a bandwidth of a broadcast channel band, wherein the allocated channel band is one of a fraction of the broadcast channel band, and a channel band formed by bonding broadcast channel bands or a plurality of fractions of a broadcast channel band.

14. The CPE of claim 13, wherein:
the allocated channel band is one of an entire broadcast channel band and a fraction of a broadcast channel band;
the preamble sequence comprises fractional bandwidth mode information of the allocated channel band and channel bonding information which is inserted into the preamble, wherein the fractional bandwidth mode information comprises bandwidth information and band position information of the allocated channel band; and
the bandwidth allocation information detector detects the fractional bandwidth mode information based on the preamble of the received OFDMA-based signal.

15. The CPE of claim 13, wherein:
the allocated channel band is formed by bonding all fractions or fractions of two or more broadcast channel bands;
the preamble sequence comprises fractional bandwidth mode information of each of the two or more broadcast channel bands which is inserted as an insertion pattern corresponding to a method of bonding two or more channel bands into the preamble of each of the two or more broadcast channel bands to which the allocated channel band of the OFDMA-based signal belongs; and
the bandwidth allocation information detector detects the preamble sequence of each of the two or more broadcast channel bands from the received OFDMA-based signal in order to detect the fractional bandwidth mode information of each of the two or more broadcast channel bands and detects channel bonding information indicating the method of bonding the two or more channel bands based on the insertion pattern of the detected preamble sequence.

16. The CPE of claim 13, wherein:
the allocated channel band is formed by bonding all fractions or fractions of two or more broadcast channel bands;
the preamble of each of the two or more broadcast channel bands to which the allocated channel band of the OFDMA-based signal belongs comprises
the preamble sequence that corresponds to fractional bandwidth mode information of each of the two or more broadcast channel bands, wherein the fractional bandwidth mode information comprises bandwidth information and band position information of the allocated channel band;
a control header of the OFDMA-based signal comprises channel bonding information indicating a method of bonding the two or more channel bands; and
the band allocation information detector detects a preamble sequence of each of the two or more broadcast channel bands from the received OFDMA-based signal in order to detect fractional bandwidth mode information of each of the two or more broadcast channel bands and detects the channel bonding information based on the control header included in the OFDMA-based signal.

17. The CPE of any one of claims 14 through 16, wherein the band allocation information detector calculates a correlation value between a preamble sequence detected from a previously received preamble and a currently received preamble, uses previous band allocation information as current band allocation information if the correlation value is greater than a predetermined threshold value, and calculates correlation values between the currently received preambles and other preamble sequences in order to detect the band allocation information if the correlation value is smaller than the predetermined threshold value.

18. The CPE of any one of claim 13, 14, 15 or 16, wherein the band allocation information detector detects the band allocation information at each super frame time interval or each frame time interval.

19. A method of using a flexible bandwidth through a BS (base station) in an OFDMA (orthogonal frequency division multiple access)-based cognitive radio system, comprising:
  allocating a channel band of unused channel bands having a bandwidth that is a natural number times a bandwidth resolution to a CPE (customer premises equipment) of a secondary user, the unused channel bands being channel bands among a range of frequencies allowed to but not used by a primary user, wherein the bandwidth resolution is a predetermined bandwidth smaller than a bandwidth of a broadcast channel band, wherein the allocated channel band comprises:
    a fraction of a broadcast channel band as the channel band for the CPE according to fractional bandwidth mode information, or
    a bundle of broadcast channel bands bonded together as the channel band for the CPE according to the channel bonding information, or
    a plurality of fractions of a broadcast channel bands as the channel band for the CPE according to the channel bonding information; and
  transmitting an OFDMA-based signal comprising a preamble sequence that comprises band allocation information indicating information regarding the allocated channel band, wherein a fraction of the broadcast channel band is allocated as a channel band for the CPE according to fractional bandwidth mode information, or is allocated as a channel band formed by bonding a bundle of broadcast channel bands, or is allocated as a plurality of fractions of a broadcast channel bands allocated as a channel band for the CPE according to the channel bonding information.

20. The method of claim 19, wherein a broadcast channel band or a fraction of the broadcast channel band is allocated as a channel band for the CPE or a channel band formed by bonding broadcast channel bands or a plurality of fractions of a broadcast channel band is allocated as a channel band for the CPE.

21. The method of claim 19, wherein if the allocated channel band is formed by bonding a plurality of channel bands, an FFT is performed once in order to generate the OFDMA-based signal.

22. The method of claim 19, wherein if the allocated channel band is formed by bonding a plurality of channel bands, an FFT is performed a plurality of times in order to generate the OFDMA-based signal.

23. The method of claim 19, wherein OFDMA-based parameters are set so that a total number of used sub-carriers within a broadcast channel band having an identical FFT size remains constant regardless of a bandwidth of the broadcast channel band, in order to generate the OFDMA-based signal.

24. The method of claim 23, wherein a sampling factor equal that remains constant regardless of a bandwidth of a broadcast channel band and an FFT size is used, and a total number of used sub-carriers within a bandwidth resolution is set to be proportional to the FFT size.

25. The method of claim 19, wherein OFDMA parameters are set so that intervals among sub-carriers within a broadcast channel band having an identical FFT size are equal to each other regardless of a bandwidth of the broadcast channel band in order to generate the OFDMA-based signal.

26. The method of claim 25, wherein a sampling factor is set to be proportional to a bandwidth of a broadcast channel band.

27. The method of claim 19, wherein if the allocated channel band is one of an entire broadcast channel band and a fraction of a broadcast channel band, the preamble sequence corresponding to fractional bandwidth mode information of the allocated channel band is inserted into a preamble of the OFDMA-based signal corresponding to the broadcast channel band to which the allocated channel band belongs, wherein the fractional bandwidth mode information comprises bandwidth information and band position information of the allocated channel band.

28. The method of claim 19, wherein if the allocated channel band is formed by bonding all fractions or fractions of two or more broadcast channel bands, the preamble sequence corresponding to fractional bandwidth mode information of each of the two or more broadcast channel bands is inserted as an insertion pattern corresponding to a method of bonding two or more channel bands into a preamble of the OFDMA-based signal corresponding to each of the two or more broadcast channel bands to which the allocated channel band belongs, wherein the fractional bandwidth mode information comprises bandwidth information and band position information of the allocated channel band.

29. The method of claim 28, wherein positions of the sub-carriers carrying elements of the preamble sequence are changed so as to carry the elements of the preamble sequence in sub-carriers of a preamble of the OFDMA-based signal at predetermined intervals among sub-carriers and carry nulls in other sub-carriers.

30. The method of claim 19, wherein if the allocated channel band is formed by bonding all fractions or fractions of two or more broadcast channel bands, the preamble sequence corresponding to fractional bandwidth mode information of each of the two or more broadcast channel bands into a preamble of the OFDMA-based signal corresponding to each of the two or more broadcast channel bands to which the allocated channel band belongs, and channel bonding information indicating a method of bonding two or more channel bands is inserted into a control header of the OFDMA-based signal, wherein the fractional bandwidth mode information comprises bandwidth information and band position information of the allocated channel band.

31. The method of any one of claims 27 through 30, wherein the preamble sequence is a sequence designed to minimize a PAPR.

32. A non-transitory computer-readable medium containing program code embodying an application program for performing a method according to claim 19.

33. A method of using a flexible bandwidth in CPE (customer premises equipment) in an OFDMA (orthogonal frequency division multiple access)-based cognitive radio system, comprising:
  receiving an OFDMA-based signal by a receiver, the OFDMA-based signal comprising a preamble sequence that comprises band allocation information indicating information regarding a channel band allocated from a BS (base station) to a secondary user, wherein the allocated channel band comprises:
    a fraction of a broadcast channel band as the channel band for the CPE according to fractional bandwidth mode information, or
    bonding together a bundle of broadcast channel bands as the channel band for the CPE according to the channel bonding information, or
    a plurality of fractions of a broadcast channel bands as the channel band for the CPE according to the channel bonding information; and
  detecting the band allocation information based on the received OFDMA-based signal,
  wherein the allocated channel band is a channel band of unused channel bands having a bandwidth that is a natural number times a bandwidth resolution, the unused channel bands being channel bands among a range of frequencies allowed to but not used by a primary user, wherein the bandwidth resolution is a predetermined bandwidth smaller than a bandwidth of a broadcast channel band, wherein the allocated channel band is one of a broadcast channel band, a fraction of the broadcast channel band, and a channel band formed by bonding broadcast channel bands or a plurality of fractions of a broadcast channel band.

34. The method of claim 33, wherein:
the allocated channel band is one of an entire broadcast channel band and a fraction of a broadcast channel band;
the preamble sequence corresponding to fractional bandwidth mode information of the allocated channel band is inserted into a preamble of the OFDMA-based signal, wherein the fractional bandwidth mode information comprises bandwidth information and band position information of the allocated channel band; and
the fractional bandwidth mode information is detected based on a preamble of the received OFDMA-based signal.

35. The method of claim 33, wherein:
the allocated channel band is formed by bonding all fractions or fractions of two or more broadcast cast channel bands;
the preamble sequence corresponding to fractional bandwidth mode information of each of the two or more broadcast channel bands is inserted as an insertion pattern corresponding to a method of bonding two or more channel bands into a preamble of each of the two or more broadcast channel bands to which the allocated channel band of the OFDMA-based signal belongs;
the preamble sequence corresponding to each of the two or more broadcast channel bands is detected from the received OFDMA-based signal to detect the fractional bandwidth mode information of each of the two or more broadcast channel bands, and channel bonding information indicating a method of bonding two or more channel bands is detected based on insertion pattern of the detected preamble sequence.

36. The method of claim 33, wherein:
the allocated channel band is formed by bonding all fractions or fractions of two or more broadcast channel bands;
a preamble of the OFDMA-based signal corresponding to each of the two or more broadcast channel bands to which the allocated channel band of the OFDMA-based signal belongs comprises the preamble sequence that corresponds to fractional bandwidth mode information of each of the two or more broadcast channel bands, wherein the fractional bandwidth mode information comprises bandwidth information and band position information of the allocated channel band;
a control header of the OFDMA-based signal comprises channel bonding information indicating a method of bonding two or more channel bands; and
the preamble sequence corresponding to each of the two or more broadcast channel bands which is detected from the received OFDMA-based signal in order to detect the fractional bandwidth mode information of each of the two or more broadcast channel bands, and the channel bonding information which is detected based on insertion pattern of the OFDMA-based signal.

37. The method of any one of claims 34 through 36, wherein a correlation value between a preamble sequence detected from a previously received preamble and a currently received preamble is calculated, previous band allocation information is used as current band allocation information if the correlation value is greater than a predetermined threshold value, and correlation values between the currently received preamble and other preambles are calculated in order to detect the band allocation information if the correlation value is smaller than the predetermined threshold value.

38. The method of any one of claims 33, 34, 35 or 36, wherein the band allocation information is detected at each super frame time interval or each frame time interval.

39. A non-transitory computer-readable medium containing program code embodying an application program for performing a method according to claim 33.

* * * * *